June 23, 1970          F. H. MERTENS          3,516,178

SIMULATOR FOR TEACHING HOW TO DRIVE

Filed July 10, 1967          2 Sheets-Sheet 1

INVENTOR:
Franz Mertens
BY
Darby, Robertson & Vandenburgh,
attys

INVENTOR:
Franz Mertens
BY
Darby, Robertson & Vanderburgh
Attys

United States Patent Office 3,516,178
Patented June 23, 1970

3,516,178
SIMULATOR FOR TEACHING HOW TO DRIVE
Franz H. Mertens, Buderich, Germany, assignor of one-half to Herrn Dr. Phil. Alfred Hanten, Unterbach, Germany
Filed July 10, 1967, Ser. No. 652,331
Int. Cl. G09b 9/02
U.S. Cl. 35—11                                    2 Claims

ABSTRACT OF THE DISCLOSURE

A driving simulator includes a crossbar distributor as a memory. The "horizontal" conductors and the "vertical" conductors of this distributor are joined at various of the intersections by switches which may be opened or closed. The "vertical" conductors are respectively connected to means responsive to the actions of the driver in actuating the simulated vehicle in response to driving conditions as projected from a film onto a screen visible to the driver. The "horizontal" conductors are connected to the various contacts of a stepping relay. The film has openings adjacent the edge which produce a signal causing the advance of the stepping relay thus establishing a circuit indicative of a preferred driver response for a particular scene. If the driver does not make the preferred response, this circuit is completed through the memory means to actuate a signal.

BACKGROUND AND SUMMARY OF THE INVENTION

The present invention relates to a simulator for teaching how to drive which comprises a test stand simulating the driver's seat of a motor vehicle with the various control elements, a film projector for projecting a film showing traffic situations, pick-off means whereby signals are supplied upon actuation of the control elements, a memory to be interrogated synchronously with the film, and which for each film scene makes available a signal corresponding to a specific kind of actuation, and means for comparing the signals supplied by the pick-off means and by the memory.

With the increasing density of traffic, the practical driving instructions, particularly during the first driving lessons are confronted with ever increasing difficulties. It can no longer hardly be justified to let a student driver who has had no experience with the steering of a vehicle and no "feeling" for the correct attitude in the different traffic situations get behind the wheel of a motor-school vehicle and allow him to drive in city traffic. Previous instruction of the student driver in theoretical training will impart to the student driver information on traffic rules or the function of the motor vehicle. However, on paper or on the blackboard he cannot learn the correct use of the various vehicle control elements, the right reaction in unforeseen situations and the "feeling" for traffic and vehicle. Another difficulty resides in the fact that the student driver frequently has no occasion to become acquainted with certain traffic situations in the actual practice of his driving lessons. A student driver from the plains has no occasion to drive a mountain-road during his driving lessons and a student driver from a rural region will hardly ever become acquainted with city traffic. Finally, it may be advantageous to test the knowledge of driving of a candidate according to objective standards and independently of the subjective opinion of an examiner.

For these and similar reasons simulators for teaching how to drive have already been provided. Through their use actual driving can be simulated under any conditions and on which the reactions of the student driver or candidate can be monitored. These prior art simulators comprise a test stand which is an imitation of the driver's seat and is provided with the various control elements such as steering wheel, accelerator-, brake- and clutch-pedals, etc. A film projector acts to project a film showing a specific traffic situation and the student driver must actuate the various control elements in a manner required by the traffic situation shown. In order to be able to check whether the candidate actuates the control elements in a correct manner, his actuation is effective each time to produce an electric signal, say, to close a contact, and these signals will be compared with a given program. If the actuation of the control elements deviates from the program, the projector may, for instance, be switched off and a slide projector switched on to produce a corresponding stationary image. The candidate will notice then that he has made a mistake and the driving instructor can explain this mistake by means of the stationary image and comment thereon. Also noises or other error signals may be supplied.

The program is produced in a manner such that for each film there is a memory in which the different actuation signals are stored and which at the beginning of each scene makes available the signal which corresponds to the kind of actuation required in the particular scene. This memory is controlled by pulses received from a sound tape running synchronously with the film or a mechanical carrier, so that it supplies the required signals at the right moment. If, during this scene of the film, the student driver actuates the correct control element, there will be no error indication and the film will continue running. If an actuation is not performed or if the wrong control element is actuated, then, for instance, the film projector will be switched off in the described manner and a slide projector be switched on.

The prior art arrangement not only requires an associated memory for each film, in which memory there are stored the actuations called for by this film, but in addition to that, a program transmitter running synchronously with the film for interrogation and stepping-on of the memory, may be in the form of a sound tape, perhaps in the form of a sound track on the film. In the former case special provisions must be made to synchronize film and sound tape. In the second case, film and sound tape must be used. Electronic means must be provided for picking off the magnetically stored signals, which altogether render the arrangement more complicated, more susceptible to interference and more expensive—see, for example, published German patent application—(DAS 1,188,333).

Another prior art simulator has a course of traffic projected by a film projector and has punched holes in the form of half-moon-shaped cutout portions of different depths at the film edge. These punched holes are scanned by a sensor and initiate different control actions depending on the respective depth thereof. Thereby, a tape recorder may be switched on to give the respective sound background for a specific scene. At another depth of the punched holes, a stationary image may be introduced, or a "setpoint signal," for instance, for "brakes" may be supplied which is compared with an actual signal from a brake lever of the simulator to determine whether the candidate has applied the brakes as prescribed by the respective situation see (U.S. patent specification 2,715,783).

In this prior art arrangement only two kinds of actuation are monitored, that is steering and brake. In both cases the setpoint signals are stored directly on the film, i.e. the steering setpoint signals on a photoelectrically scanned sound track of the film, and the brake setpoint signals by the perforation. Limits are set to the number of the operations thus to be monitored. It is likely to offer considerable difficulty in practice, say, by further differentation of the depths of the punched holes or cutout portions to store further setpoint signals on the film itself, maybe for separate signals for light and directional signal actuation. In this arrangement, too, a photoelectrically scanned sound track is required on the film for said one setpoint signal.

It is the object of the present invention in a device of the type indicated in the beginning to monitor any desired number of different operations of actuation in a manner as simple as possible, at the same time, however, avoiding simultaneously moving magnetic or photoelectric information carriers as they are required in the prior art arrangements.

The present invention resides in the fact that (a) the memory (5) can be stepped-on and
(b) control signals producible by punched holes (13) at the film edge effect the stepping-on of the memory (5) and the comparison of the respective memory signal with the actuation signal supplied by the pick-off means (4).

The present invention provides a device which permits making available any number of heterogeneous setpoint signals without magnetically or photoelectrically scanned information tracks. This possibility is provided by the co-operation of a stepping memory with punched holes at the edge of the film. In this arrangement the punched holes need not supply different types of signals. They only advance the memory by one step each time, so that the next signal in the memory will be made available, and release the comparison of this signal with the actual actuation signal. However, since only a single stepping pulse is required from the film perforations and the signal selection proper is taken over by the memory, these pulses may be produced by simple punched holes at the film edge. Thus, by the co-operation of the two features there is provided a simple device without complicated electronic (magnetic or photoelectric) signal generation.

The scan of the punched holes may be effected in simple manner without complicated scanning heads. This is done, for instance, by scanning the film perforation with a sprocket wheel rotating synchronously with the film drive sprocket. This sprocket wheel engages in the punched holes and makes electric contact with a counter-roll abutting resiliently on the other side of the film.

The control signal releasing the comparison may be directed via an adjustable time delay element. On this time delay element different reaction times may then be adjusted. The perforation and therewith the pulse transmission takes place at the location of the film where the event occurs necessitating a specific actuation (for instance, of the brake). The interrogation, thus the check, whether the student driver has actually reacted in the correct way, however, takes place a short time later as determined by the time delay element. The student driver need not react immediately—which would not be possible—but he is given a certain reaction time which may be adjusted and varied depending on the respective requirements.

The punched holes may supply signals in encoded form which will be converted into the control signals in a decoder. By way of example, the arrangement can be such that one output of the decoder supplies an interrogation signal releasing the comparison, while another output thereof effects the advance of the memory. Instead of the program memory, however, also other apparatus functions may be controlled by the punched holes.

DESCRIPTION OF THE SPECIFIC EMBODIMENT

Figure 5:
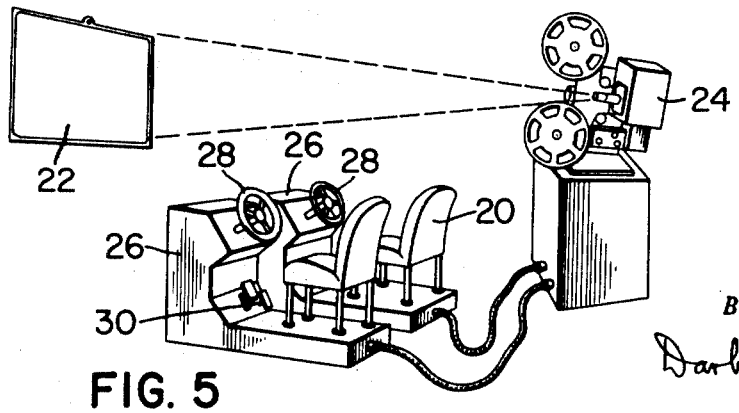
FIG. 5 illustrates in perspective a driving simulator of the type with which the present invention might be employed.

Referring to FIG. 5, there is illustrated a driving simulator at which the operator is seated on a chair 20 in a position to view the image on a screen 22. This image is obtained from a film 1 (FIG. 1) in a movie projector 24. The console 26 in front of the chairs 20 has representations of the usual automobile controls, e.g., steering wheel 28, brake pedal 30, etc.

Figure 3:
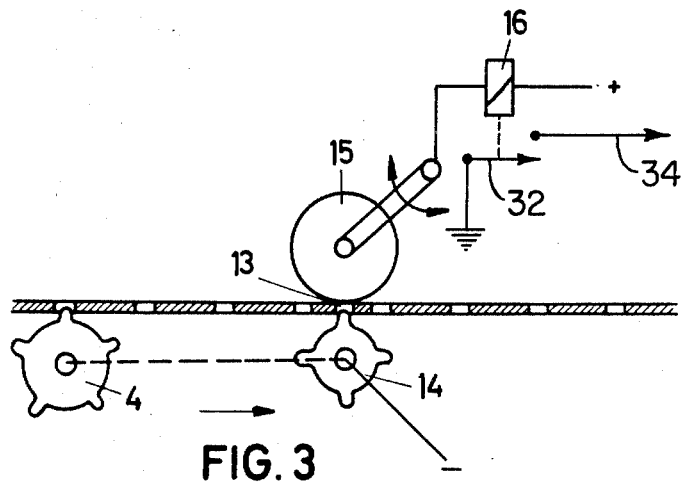
FIG. 3 illustrates the scan of the perforation.
Figure 2:
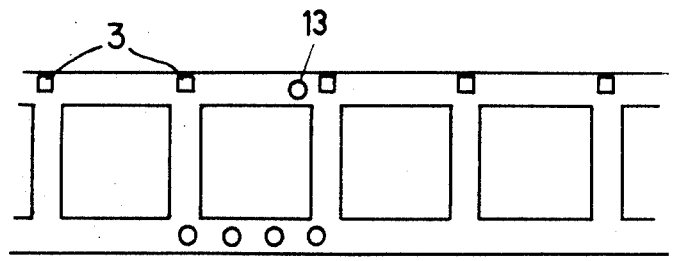
FIG. 2 illustrates a 16-mm.-film having two perforations for different signals.
Figure 1:
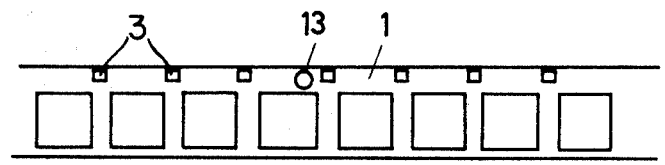
FIG. 1 illustrates a 8-mm.-film having a perforation according to the invention.

Reference numeral 1 in FIG. 1 designates a 8-mm.-film from which traffic situations are projected by means of a projector, on which projected images the student driver shall concentrate. Film 1 has perforation holes 3 into which the teeth of a film drive sprocket 4 (FIG. 3) project to engage and drive the film.

Figure 4:
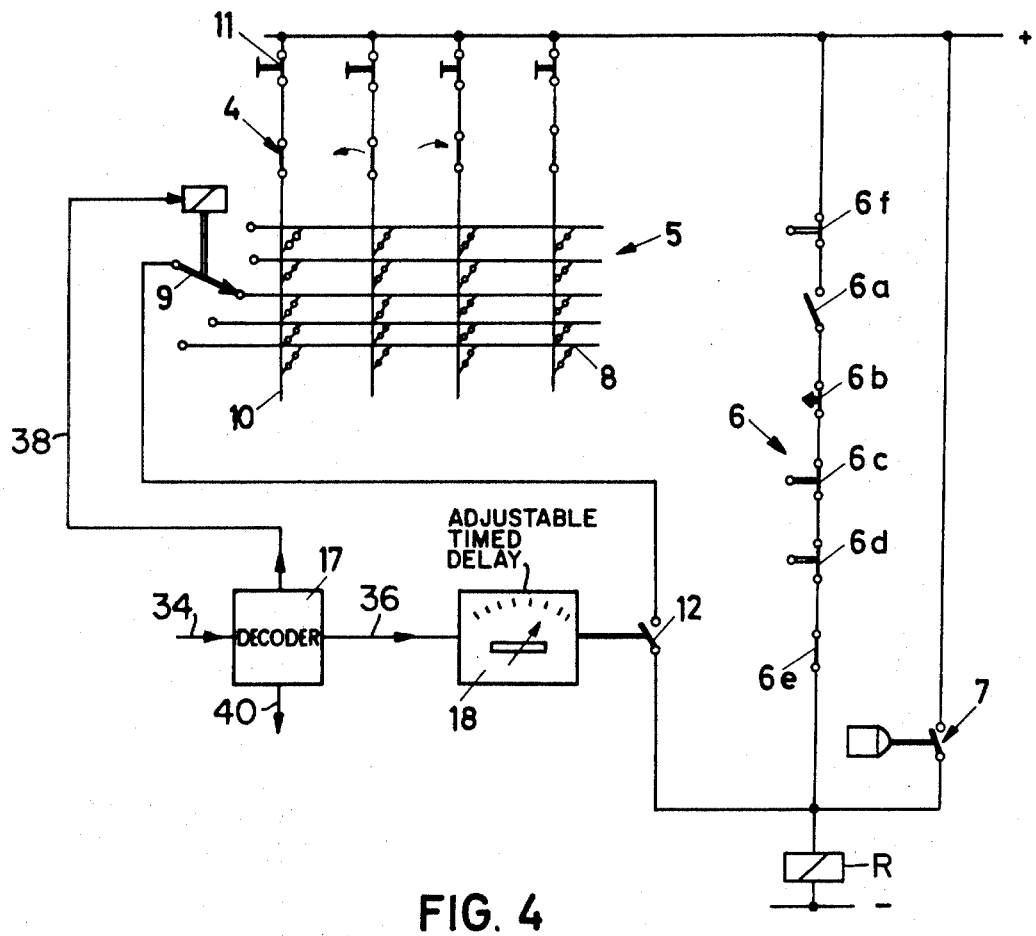
FIG. 4 illustrates schematically the error checking circuit.

The student driver sits in the test stand simulating the driver's seat of a motor vehicle and having the corresponding control elements. It is the task of the student driver to actuate these control elements in a manner corresponding to the scene shown. To this end, the control elements are monitored by switches 4 (FIG. 4). In a program memory generally 5, associated with the respective film or connected accordingly, there is stored what these control actions should actually be like. The program memory 5 is advanced a step at a time and interrogated by film scanning means to be described heerinafter, and if there is a difference between the stored actuation and the actuation of the control elements actually performed by the student driver, a relay R will supply a signal. By way of example, a horn may then be actuated or the projector be switched off. Reference numerals 6 and 7 designate circuits for detecting other errors not programmed.

The memory 5 is designed in the manner of a crossbar distributor. The horizontal contact bars are scanned one after another by means of a rotary selector 9. The vertical contact bars 10 each correspond to one kind of actuation of the control elements, say, brake, left directional signal, right directional signal, dim lights, etc. Only four such contact bars are illustrated here. At the points of intersection of the vertical and horizontal contact bars 10 and 8, respectively, the same are connected with each other respectively via a microswitch. The microswitches may be opened by pressing down a rod. On this arrangement there may be placed a plastic plate with pre-formed holes, but with all the slugs still in the holes, which opens all of the microswitches by pressing down the rods. At the points where the contact bars are to be connected with each other, the slugs in the pre-formed holes have been removed so that the rods of the microswitches may enter into the holes and the switches remain closed. This type of crossbar distributor is known per se. It has the advantage that for each film only one such perforated plate need be provided for the program storage. The vertical contact bars or conductors 10 are connected with a voltage source via the switches 4 as well as one additional manually operable switch 11 for each bar. Each horizontal contact bar or conductor 8 is connected with one—or possibly with several—vertical contact bars according to the desired program. The moving contact of the rotary selector 9 connects to the other pole of the voltage source via an error checking contact 12 and the solenoid of the relay R.

When the error checking contact 12 closes, then by actuation of the corresponding control element the corresponding switch 4 must be opened, so that a circuit is not completed through the respective vertical contact bar 10, connected with the horizontal contact bar 8 just interrogated via the rotary switch 9 and the closed (by the programming) microswitch connecting the two. Otherwise the relay R is actuated by the energization of its solenoid and records an error.

The relay R is actuated independently of the error checking contact 12 when the motor has been started and the gear shift is actuated, without the clutch having previously been actuated. This is the purpose of the circuit arrangement generally 6, which connects the relay R to the voltage source in parallel with the memory 5 and the error checking contact 12. This circuit 6 has in series-connection: a switch 6a closed when "starting" the motor, a switch 6b opened when actuating the clutch, as well as one switch each 6c–f opened when the gearshift lever is positioned in the first, second and third gears and idling, respectively. With switch 6a closed, the relay R is normally not excited as yet via circuit 6, since the simulated vehicle is not "in gear" with the associated switch being open. However, when actuating the gearshift lever without previously disengaging the clutch (and thus opening switch 6b), the relay R is actuated and records an error since none of the contacts 6c–e is open because the vehicle is not yet in gear. In parallel with the circuit 6 there is a switch as at 7 which is closed by the deflection of the steering wheel being too great and thus recording an error by energizing relay R.

By manually actuating respective switches 11, particular types errors may be eliminated so that at first only gross errors will be recorded, say, in the case of a beginner.

The error checking contact 12 is controlled by holes 13 which are punched into the film edge between the perforation holes 3. These holes 13 are scanned by means of a sprocket wheel 14 driven synchronously with the film feed. In the presence of a hole 13, wheel 14 makes electric contact with a backup roll 15 abutting resiliently on the other side of the film, and causes a relay 16 to respond to close switch 32. The sprocket and backup roll comprise the film pickoff or signal generating means.

Instead of one hole there may also be provided more such holes which represent different signals according to a specific code. Thus there would be a series of timed pulses on line 34, which pulses are supplied to a decoder 17 and may produce one out of three output signals. Decoder 17 could take the form of the relays (mechanical or solid state) such as the telephone companies have used for many years and would not be a great deal different than relay 9. With a single signal on line 34 (within a predetermined time period) a connection would be made so that an output signal at line 36 is obtained. Two impulses at line 34 within a limited time period would produce an output signal at line 38. Three impulses within said time period would produce a signal at line 40. At the end of the time delay the relay of the decoder would reset to zero.

The signal at line 36 is the interrogation or error checking signal which actuates the error checking contact 12 via an adjustable time delay element 18. A permitted reaction time may be set on the time delay element and only after this time delay the error checking contact 12 is closed. The signal at line 38 of the decoder 17 acts to advance the rotary selector 9 by one step, so that another horizontal contact bar 8 is then connected and requires a corresponding different actuation operation. A third pulse of the decoder 17 (at line 40) may be used for other control actions.

The invention is claimed as follows:
1. In a driving simulator for teaching the individual or testing his driving ability and comprising a test stand having various vehicle control elements, responsive means connected to and actuated by said elements for indicating which, if any, of the elements are operated by the individual, an apparatus for exhibiting pictures of scenes of various traffic situations from film, a memory to be interrogated synchronously with the pictures which for each scene supplies a signal corresponding to a proper actuation of the elements to be compared with the actual manipulation of said control elements as detected by said responsive means, and an indicator to compare said signals with the indications obtained from said responsive means, the improvement comprising:
    said memory including
        a crossbar distributor comprising a plurality of first conductors, a plurality of second conductors and switch means joining each of the first conductors respectively with each of the second conductors respectively, each of said second conductors being connected to a respective responsive means, each of said switch means being operable between an open position and a closed position whereby each first conductor may be connected to, or isolated from, the respective second conductor joined by the respective switch means, and
        stepping means having a first line and a plurality of second lines which are connected to said first line in sequence, said second lines respectively being connected to said first conductors respectively,
    said memory being spaced from said film;
    said film having a plurality of markings adjacent the edge of the film; and
    detector means positioned to be actuated by the presence of a marking passing the detector means for producing an electrical signal when a marking passes the detector means, said detector means being connected to said stepping means to advance said connection of the first line to a subsequent second line when said detector means is actuated.
2. In a driving simulator as set forth in claim 1, wherein said markings supply signals in encoded form and said detector means include decoder means for decoding said encoded signals.

References Cited
UNITED STATES PATENTS

| | | | |
|---|---|---|---|
| 1,210,961 | 1/1917 | McCormick | 352—92 |
| 2,659,164 | 11/1953 | Durham | 35—11 |
| 2,706,218 | 4/1955 | Wootten | 352—92 |
| 2,715,783 | 8/1955 | Chedister et al. | 35—11 |
| 3,015,169 | 1/1962 | Chedister et al. | 35—11 |
| 3,186,110 | 6/1965 | Smyth | 35—11 |
| 3,266,174 | 8/1966 | Bechtol et al. | 35—11 |

EUGENE R. CAPOZIO, Primary Examiner

W. H. GRIEB, Assistant Examiner